United States Patent [19]

Gawrys et al.

[11] Patent Number: 5,008,930

[45] Date of Patent: Apr. 16, 1991

[54] CUSTOMER DEFINABLE INTEGRATED VOICE/DATA CALL TRANSFER TECHNIQUE

[75] Inventors: George W. Gawrys, Bridgewater, N.J.; Richard A. Oberman, Park Ridge, Ill.; William T. Willcock, Rumson, N.J.

[73] Assignee: AT&T Bell Laboratories, Murray Hill, N.J.

[21] Appl. No.: 426,384

[22] Filed: Oct. 24, 1989

[51] Int. Cl.$^5$ ............................................. H04M 3/58
[52] U.S. Cl. .................................... 379/210; 379/211; 379/212; 379/96
[58] Field of Search ................. 379/96, 210, 211, 212, 379/213, 214, 201, 265, 266, 309

[56] References Cited

U.S. PATENT DOCUMENTS

| | | | |
|---|---|---|---|
| 3,624,307 | 11/1971 | Sikorsky | 179/27 |
| 3,790,717 | 2/1974 | Abramson et al. | 179/15 |
| 4,532,377 | 7/1985 | Zink | 179/2 |
| 4,535,199 | 8/1985 | Zink | 179/2 |
| 4,656,623 | 4/1987 | Dalby, Jr. et al. | 370/60 |
| 4,656,624 | 4/1987 | Collins et al. | 370/60 |
| 4,805,209 | 2/1989 | Baker, Jr. et al. | 379/96 |

OTHER PUBLICATIONS

No Author, *Comm. News*, vol. 23, No. 7, Jul. 1986, pp. 31-33.

Falconer et al., *Proc. IEEE*, vol. 74, No. 9, Sep. 1986, pp. 1246-1261.
Keeney, *Telephoney*, vol. 214, No. 12, Mar. 21, 1988, pp. 28-30.
Page, *The Office*, vol. 107, No. 5, May 1988, pp. 69-70.
Borton, *Proceeding ISDN'88*, London, England, Jun. 1988, pp. 155-162.
Canavan et al., *IEEE Global Telecomm. Conf. & Exhibition*, Hollywood, Fla., Nov./Dec. 1988, vol. 2, pp. 883-887.

*Primary Examiner*—James L. Dwyer
*Attorney, Agent, or Firm*—Erwin W. Pfeifle; Barry H. Freedman

[57] ABSTRACT

In the present invention, a first agent terminal, of a group of multi-windowing agent terminals, answers an integrated voice/data call by (i) directly receiving and displaying call-related information from a communication system in a "Phone" window, and (ii) retrieving data information from a host database system, and then transferring the voice portion and either (a) predetermined received call-related information, or (b) a current data display status indication directly to a second agent terminal of a second group of agent terminals. The second agent terminal uses the received data to access a same or other host database system for automatically displaying the pertinent data at the second agent terminal to continue the voice and data call.

11 Claims, 6 Drawing Sheets

CUSTOMER DEFINABLE INTEGRATED VOICE/DATA CALL TRANSFER TECHNIQUE

TECHNICAL FIELD

The present invention relates to a customer definable automated integrated voice/data call transfer technique which is usable, for example, in ISDN systems or information management services that enable an agent answering a call to obtain caller related information from a communication system, automatically send it to a host database computer system application software, retrieve caller records without requiring a caller to provide verbal information and then transfer the voice and collected data information to a preferred agent terminal for continuing the call.

DESCRIPTION OF THE PRIOR ART

The use of information management services has been increasing in recent years and is projected to be a 25 billion dollar market by 1990. Many of these services are called "telemarketing", a broad term that can be used to label anything from sales, to customer accounting services, to order processing, to conducting surveys, and to many other services that all use telecommunications. One prior art technique used for such information management services requires that an agent verbally query a caller for pertinent information, then manually type such information into a host database computer system, whereby pertinent caller records are stored and retrieved.

A second technique retrieves caller records automatically from a host database computer system, but requires that the caller data first be routed to the host database computer system application software prior to the delivery of such caller data to the agent terminal. In this regard see, for example, the article entitled "AT&T Customer Trial of the ISDN Primary Rate Interface" by G. Canavan et al. in the Conference Record of the *IEEE Global Telecommunications Conference and Exhibition*, Hollywood, Florida, Nov./Dec. 1988, Volume 2, at pages 883-887. There, individual agents of a "Shared Group" of agents handle incoming calls for several campaigns simultaneously, where calls for each campaign are associated with separate telephone numbers. With Integrated Services Digital Network (ISDN), the called number, calling party number, and agent identity are sent from the network switch to the host database computer application software so that the host database computer system can bring up the appropriate campaign and script automatically at the correct agent's display terminal.

In many instances, however, an agent initially answering a call may not be able to provide the appropriate answers for the caller, and such call may require a transfer to a preferred or supervising agent. U.S. Pat. No. 4,805,209 issued to W. T. Baker, Jr. et. al. describes a system for the transfer of voice and data information through a digital switch. There, the voice sets associated with the agent terminals are connected to a Computerized Branch Exchange (CBX), while the associated data terminals of the agent terminals are connected to a Host database system, with a Logical Unit (LU) 6.2 interface connection coupling the CBX and Host for signal transfer. After a call has been received at a first voice phone, and the call is to be transferred from a first voice phone to a second voice phone, the first voice set initiates a standard voice call transfer by providing the extension of the second voice set, where the call is to be transferred to, to the CBX. Software in the CBX transfers the voice call directly to the second voice set and disconnects the first voice set, and also sends the extension of the transferred to second voice set via the data interface to the Host which causes software to perform a table look-up in order to identify the second data terminal from the extension number of the second voice set. Having identified the second data terminal associated with the second voice set, the host causes the display from the first data terminal to be displayed at the second data terminal. This system requires a CBX, a link between the CBX and the host, software at both the CBX and the host, and table look-up procedures and maintenance of such table, which may be costly and limited to specific equipments. The Baker, Jr. system is also limited to the single network shown in FIG. 1 thereof, and does not provide for transferring integrated voice and data calls between networks not having a common PBX and host. Additionally, a standard CBX is used in Baker, Jr. for all data actions in sending information to the host, and such standard CBX was not contemplated for use with Integrated Services Digital Networks. Also, the second agent's extension must be known, which does not allow for the second agent to be part of a pool of agents.

The problem remaining in the prior art is to streamline the initial interaction of an incoming information management services call, and the (1) transferring of a call from one agent to another agent or supervisor when necessary, without knowing the specific extension of the second agent, a priori, (2) providing of a solution that is independent of actions initiated at a Private Branch Exchange (PBX) so that a Host database just sees actions of the terminals and not the PBX, (3) working across ISDN or other networks, (4) avoiding the administration of a table of extension numbers to Logic Unit mapping, and (5) avoiding possible interruption of the second agent's data session with the incoming call.

SUMMARY OF THE INVENTION

The foregoing problem in the prior art has been solved in accordance with the present invention which relates to customer definable integrated voice/data call transfer techniques which include (1) a first agent terminal with a multi-window display, and (2) processing equipment that directs caller-related incoming voice and data information from a communications network to the first agent terminal and routing commands from the agent terminal to an appropriate host database computer system to automatically retrieve customer-desired data. In accordance with the present invention, once an agent terminal receives call-related data information, and any other further data, and finds the need to transfer the call to a preferred agent or supervisor, the operation of a programmable function key at the agent terminal causes the transfer of the voice call and associated data to the preferred second agent or supervisor terminal. More particularly, in a preferred embodiment, a host database system currently associated with an agent terminal maintains an updated index number for any most recent data transaction of the first agent terminal. In the transfer of a call from one agent terminal to another agent terminal associated with the same host computer system, either the index number, or the call-related information received from a communication network, is transferred to the second agent terminal and used for accessing the host database to retrieve the same data for the second agent terminal. Where the original agent terminal and the preferred agent terminal are not colocated and use different host computers, then, for example, the calling and called number is transferred to automatically retrieve the appropriate data from the second host computer for display at the preferred agent terminal screen.

Other and further aspects of the present invention will become apparent during the course of the following description and by reference to the accompanying drawings.

DETAILED DESCRIPTION

Figure 1:
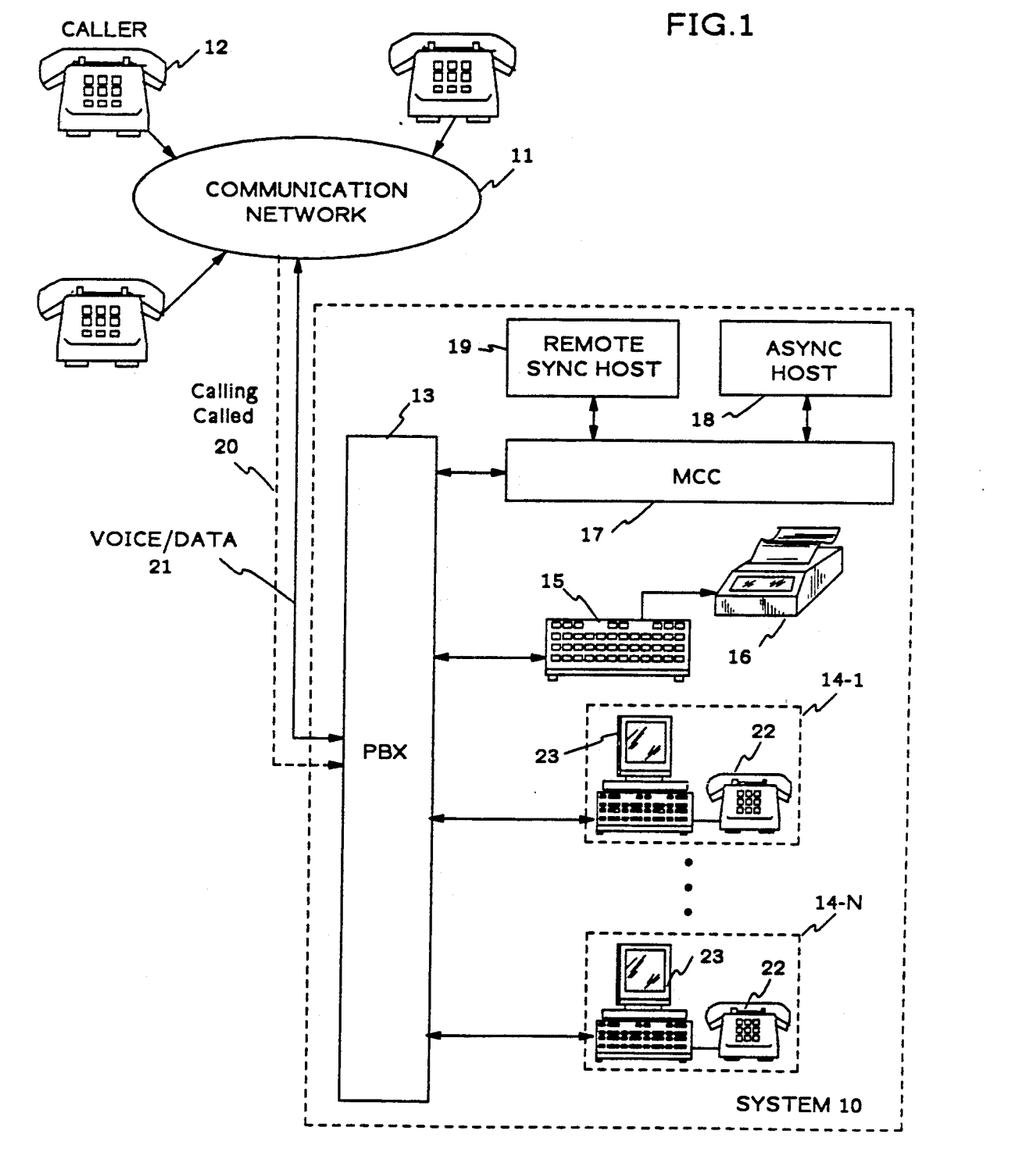
FIG. 1 is a block diagram of an exemplary customer-programmable integrated voice/data system for use with the present invention.

The present invention relates a customer programmable integrated voice/data call transfer capability which is described hereinafter relative to the telecommunications information management services market, such as telemarketing, but it should be understood that the present invention could be used for other telecommunications markets where calling party information is displayed at a terminal and may be transferred to another terminal. FIG. 1 illustrates a preferred embodiment of an exemplary telemarketing system 10 arrangement for practicing the present invention, but it is to be understood that such exemplary system arrangement could be modified to comprise other suitable equipments which provide the functions described hereinafter, and still fall within the spirit and scope of the present invention.

In FIG. 1 is an exemplary telemarketing system 10 for practicing the present invention, a description of which is provided here for completeness. System 10 is connected for bidirectional communication with a national communications network 11, such as the AT&T network in the United States, to provide communications with many telephones, such as telephone 12, being serviced within the large geographical service area of communications network 11. It is to be understood that communications network 11 is arranged for transmitting caller related information, such as the calling number and called number and any other caller supplied information such as a social security or account number, over a signaling channel 20 to system 10 while transmitting bidirectional voice/data information over channels 21 as may be found with any Integrated Services Digital Network (ISDN). System 10 is shown as comprising a Private Branch Exchange (PBX) 13, such as an AT&T DEFINITY TM communication system, (System 85 or 75 PBX) with Automatic Call Distribution (ACD), that functions to provide the interface and call distribution capability for voice and data between communications network 11 and the components of system 10.

PBX 13 is shown connected to (a) a plurality of N agent terminals $14_1$ to $14_N$, such as the AT&T 6500 series Multifunction Communication System (MCS) terminals with multi-windowing capability and a telephone 22, for answering incoming, or initiating outgoing, telemarketing voice/data calls, (b) a printer controller 15 (e.g., AT&T Model 6561 printer controller) and printer 16 for providing print-outs of data for purposes of system administration, etc., and (c) a Multi-Function Communications Controller (MCC) 17 as, for example, an AT&T model 6544 MCC. Communications between these components can comprise any suitable protocol as, for example, the Digital Communications Protocol (DCP) for use between a System 75 or 85 PBX and the agent terminals 14 and printer controller 15, which protocol uses two information channels operating at 64 kb/s and a channel for signaling information running at 8 kb/s or the comparable ISDN Basic Rate Interface with 2 B (bearer) 64 kb/s Channels and one D (message oriented signaling) 16 kb/s channel; and the ISDN Primary Rate Interface (PRI) protocol providing 23 B (bearer) 64 kb/s channels and a single 64 kb/s D channel between PBX 13 and MCC 17.

MCC 17 functions as an interface between PBX 13 and one or more host application database computer systems 18 and 19, where for purposes of illustration a first asynchronous host application database computer system 18 is shown and understood to be co-located with MCC 17, and a second synchronous host application database computer system 19. Such second host application database computer system 19 can be located remote from MCC 17, as in another building. For purposes of discussion hereinafter, it will be assumed that a separate host application database computer system is used for storing data related to each different campaign or service an agent might handle, and caller-related data and associated transactions.

In operation, for an incoming customer service application such as catalog sales, airline reservations, company health or stock plan or banking information, information of a nearest dealer location, etc., the exemplary caller 12 inputs, for example, a designated Service number, e.g., an 800 service number, reserved by communications network 11 for a specific service provider dealing with the specific service that the caller desires. The voice call, along with caller related data information such as the telephone number of the caller telephone (calling party number) as may be provided by Automatic Number Identification (ANI) in communications network 11, the identity of the dialed telephone number (called party number), as may be provided by Dialed Number Identification Service (DNIS) for 800 service calls in communications network 11, and any caller provided keyed information as, for example, an account or social security number, traverses network 11 and arrives at an Automatic Call Distributor (ACD) forming a part of PBX 13. For purposes of illustration, it will be assumed that agent terminal $14_1$ is logged onto system 10, and is presently idle and not handling a call. The ACD functions to choose an appropriate idle agent terminal, which in this case is assumed to be agent terminal $14_1$, and alerts that agent terminal for the incoming voice call at agent terminal telephone 22.

Figure 3:
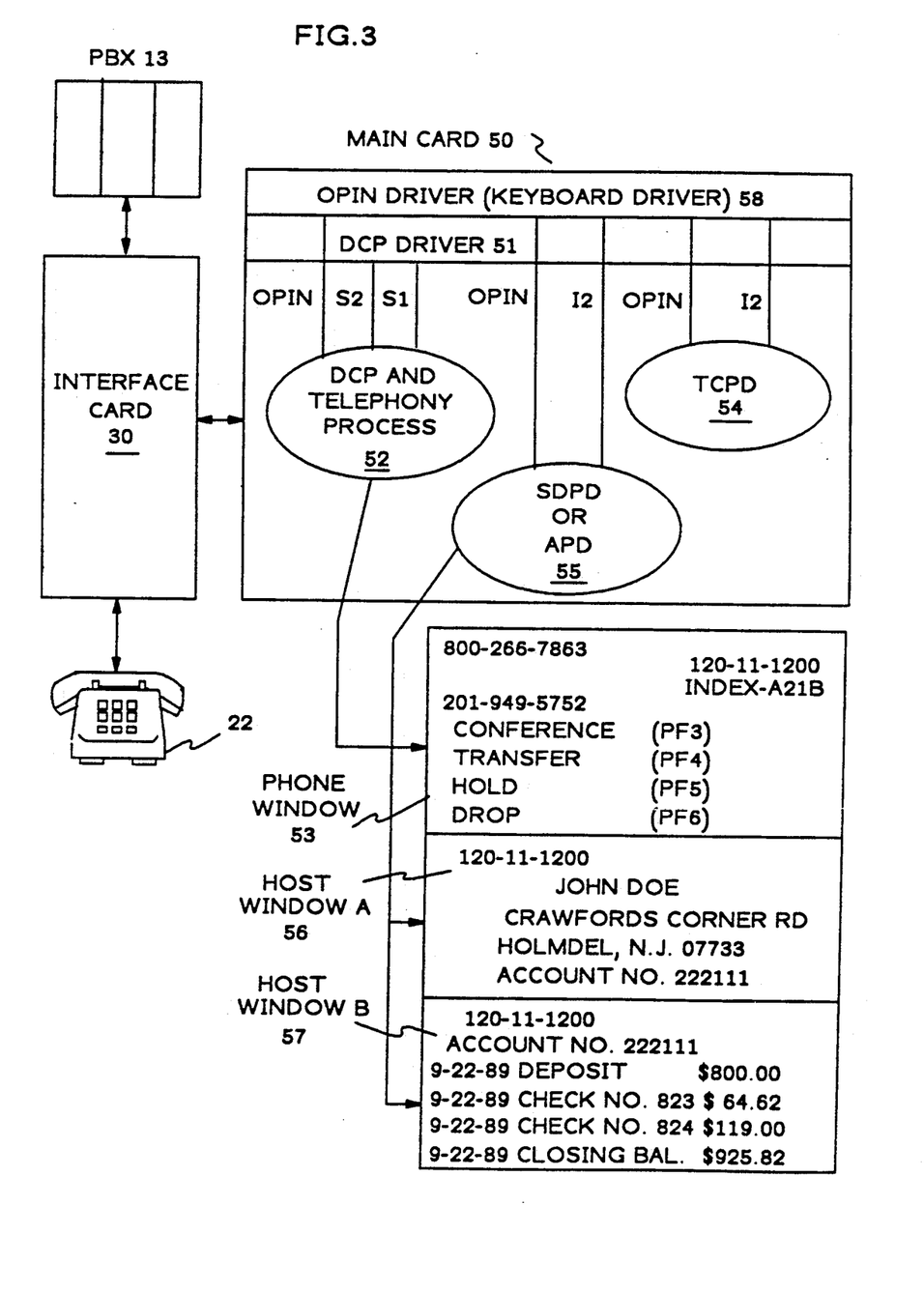
FIG. 3 is a software block diagram of a main card of an agent terminal in the system of FIG. 1.

Logic circuitry in agent terminal $14_1$ receives the ANI and DNIS information, and any other caller provided data, and displays such information in a "Phone" window 53 of agent terminal $14_1$ as shown in FIG. 3. Agent terminal then transmits all or part of this information via a predetermined channel through PBX 13 and MCC 17 to automatically query the appropriate host application database computer system, e.g., host computer system 18, for retrieving customer or other appropriate records relative to the campaign or service to be provided. For example, the called party number can be used by agent terminal $14_i$ to automatically access the host application database computer system associated with the service denoted by that called number. Additionally, the calling party telephone number, social security number or account number can be used to obtain the appropriate file record for that service, e.g., the area code can be used to provide a list dealers within that area code, or the whole calling number, social security number or account number can be used to extract that customer's records from the host database computer system and have the relevant information displayed as shown in Host computer system windows 56 and 57 of FIG. 3 for a bank account.

More particularly, as the agent answers the call at agent terminal $14_1$, the appropriate call-related information (ANI, DNIS, etc.) originally received by the agent terminal $14_1$ from communications system 11 is automatically displayed in a first "Phone" window 53 on terminal screen 23 in accordance with the present invention. Agent terminal $14_1$ also provides service related functions and/or records that can be automatically obtained by terminal $14_1$ or requested by the agent, e.g., based on the received calling number, for display in one or more concurrent "Host" windows 56 or 57 associated with a queried host application database computer, e.g., host 18. The agent terminal $14_1$ responds to the service requested by the calling party by using the received and displayed information automatically, or by the agent using programmable function keys at the agent terminal, to retrieve other needed information from the host database computer system, and the agent concludes the call to await the next call.

Figure 2:
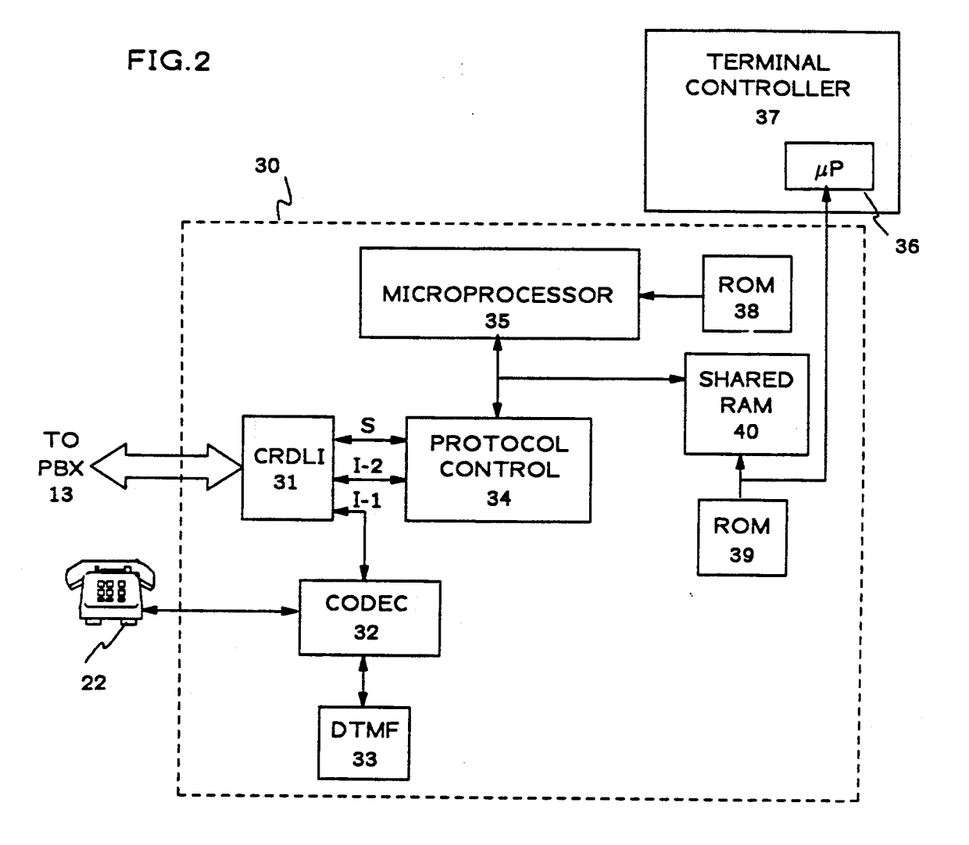
FIG. 2 is a hardware block diagram of an interface card of an agent terminal in the system of FIG. 1.

Relative to the above example, FIG. 2 illustrates a block diagram of an exemplary interface card 30, located in each agent terminal $14_i$, that functions to process and direct the voice, data and signaling information between PBX 13 and other portions of agent terminal $14_i$ during the handling of a call. For purposes of discussion hereinafter, and not for purposes of limitation, it will be assumed that the protocol used between PBX 13 and agent terminal $14_i$ will be the ISDN BRI protocol, as defined hereinbefore, which is used, for example, with an AT&T DEFINITY communication system. It is to be understood that interface card 30 effectively functions as a gateway for signals propagating between PBX 13 and agent terminal $14_i$, and is shown as comprising an interface transformer 31, such as an AT&T Code 257 AT device which is also known as a Cost Reduced Data Link interface (CRDLI), that interfaces with PBX 13 and the rest of both interface card 30 and agent terminal $14_i$ to bidirectionally receive and direct the voice, data and signaling information relating to a call in the proper direction and with the appropriate protocols. The voice portion of the signals (B1 channel in the BRI protocol) propagating between PBX 13 and agent terminal $14_i$ is directed between interface transformer 31 and a codec 32 which includes a device 33 that functions with the telephone keyed signals to be used as, for example, a Dial Tone Multi-Frequency (DTMF) device for agent initiated outgoing calls. The voice signals themselves propagate between codec 32 and agent terminal telephone 22 to permit the agent to converse with a caller.

A Protocol Controller 34 functions to interact with interface transformer 31 and each of a first microprocessor 35, disposed on interface card 30, and a second microprocessor 36, disposed at the agent terminal controller 37, to provide the appropriate protocol for each of the signaling (S1 and S2) and data (I2) channel information, such as the ANI, DNIS information and the commands to be transmitted to or received from other portions of agent terminal $14_i$. The first and second microprocessors 35 and 36 have associated therewith a first and second Read Only Memory (ROM) 38 and 39, respectively, to provide the necessary firmware for each microprocessor. A shared Random Access Memory (RAM) 40 provides for the queuing and transfer of data control and status signals between microprocessors 35 and 36 and protocol controller 34. Therefore, any signaling or data channel signals that are received from PBX 13 are sent through interface transformer 31 and protocol controller 34 and temporarily stored in shared RAM 40. Microprocessors 35 and 36 then access the stored S and I2 channel information and function as directed by the firmware in associated ROMs 38 and 39, respectively, as will be explained in greater detail hereinafter.

FIG. 3 is a diagram to aid in explaining the functioning of agent terminal $14_i$ in conjunction with the prior discussion of FIGs. 1 and 2. FIG. 3 illustrates the interconnection of PBX 13 with Interface card 30, and, in turn, agent terminal telephone 22 and a Main Card 50 in the agent terminal $14_i$ to provide (1) the necessary processing of the received I2 and S signals of the exemplary DCP protocol, and (2) produce the necessary signaling commands and window displays at the agent terminal for processing a call. For purposes of explanation, it will be assumed that telemarketing system 10 is used to provide service relative to, for example, a bank when a caller dials 800-266-7863.

When a caller 12 inputs the calling telephone number 800-266-7863, communications network 11, e.g., an Integrated Services Digital Network, accumulates the calling and called numbers, and any caller supplied data, and directs the voice call with the call-related information to system 10. When the voice call, and the associated call-related information which may include a caller provided social security or bank account number, is received by PBX 13, the automatic call distribution of PBX 13 finds an idle logged-on agent terminal $14_i$ and transmits the (1) voice, and (2) associated signaling information via the exemplary DCP I1 and S channels to interface card 30. Protocol controller 34 receives and decodes the I1 and S channel messages, and the firmware in ROM 38 of interface card 30 queues the incoming call message(s) in shared RAM 40 and interrupts second microprocessor 36 in terminal controller 37, while the agent telephone 22 is alerted via codec 32 to the reception of a call. A DCP Driver 51 (FIG. 3), in the firmware of main card 50 for second microprocessor 36, services the interrupt and routes the message to an exemplary DCP process 52 which also controls a novel "Phone" window 53 on the screen of agent terminal $14_i$. Phone window 53 functions to initially display, for example, the functional use of each of the Programmable Function keys, e.g., all or part of the function keys 1 to 10 of the agent terminal keyboard. For purposes of discussion Phone Window 53 of FIG. 3 is shown as displaying the purpose of function keys PF3-PF6, but it is to be understood that all programmable functions of an agent terminal can also be displayed along with any other pertinent start-up information needed by an agent.

The DCP process 52 parses the message(s) received on a call and updates Phone window 53 accordingly by adding, for example, the called number, the calling number, and any other signaling data provided by the caller over the S signaling channel as, for example, a social security or account number which may be necessary for servicing a caller, e.g., in a bank, etc. The DCP process 52 then communicates with a Terminal Control Process Driver (TCPD) 54 through a keyboard driver 58, which emulates an agent depressing a corresponding pre-recorded playback key on the agent's keyboard. TCPD 54 functions as terminal controller 37 for controlling the special terminal features, such as Command Mode processing, and Workstation Control Mode processing in conjuction with keyboard Driver (Opin) 58 which also serves to route messages between TCPD 54 and (1) Synchronous Data Process Device (SDPD) or Asynchronous Process Device (APD) 55 or (2) DCP process 52. SDPD or APD 55 work with the host database application computer systems 19 and 18, respectively, to provide normal agent terminal functions as found in other systems. Therefore, TCPD 54 provides control for moving information around both agent terminal 14$_i$ and system 10 by looking at, for example, ANI and/or DNIS information received from a caller to see what is occurring at that instant of time, and sending needed information (1) between windows automatically or (2) via programmed simulated keyboard key strokes automatically back through PBX 13 using the I2 channel to MCC 17 to retrieve information from host application database computer systems 18 and/or 19.

As a result, once window 53 has displayed the call related data, the DCP process automatically transmits a message of pre-recorded keystrokes to TCPD 54 for a first step to access the appropriate Host computer database system 18 or 19 associated with providing the service indicated by the 800 service number call by caller 12. TCPD 54 receives the message from DCP process 52, and invokes the playback of the corresponding pre-recorded keystroke(s), which commands associated with such keystrokes may be stored in ROM 39 or Shared Ram 40 of interface card 30, or other RAM memory, for the programmable functions. Such pre-recorded keystrokes may be programmed to automatically make a main menu selection based on the received called number (DNIS) 266-7863 relating to a banking service, and move the caller provided social security number to Host window 56. Once such selection has been made, TCPD 54 may request SDPD or APD 55 to display host window 56 indicating the identity of the caller from his telephone number, or provided social security or account number. Such window could also include a listing of programmed function key assignments (not shown) for bringing up any available services that may be requested by a caller relating to such service, as, for example, a movement of funds between accounts, stopping a check payment, or information about recent transactions and a closing balance on a specific account.

In the present example, caller 12 wishes information about a a closing balance, and TCPD 54 would cause the automatic transfer of the caller social security number from phone window 53 or window 56 via DCP process 52 into the host window 57. Then by the agent depressing an appropriate programmable function key requesting the display of recent transactions and a closing balance, TCPD would send the caller social security number through PBX 13 and MCC 17 to the correct host application database computer system 18 or 19, storing the desired information about the account, in order to retrieve the most recent transactions and closing balance for that account for display in window 57. It is to be understood that such windows 53, 56, 57 would all appear as multi-windows on the screen of the agent's terminal 14$_i$ in, for example, an overlapping sequence, and the agent could move between such windows. As might be indicated in Phone window 53, where the use of function keys might also be shown, during a call an agent may be required to place a caller on a conference or on hold, which functions can be accomplished by depressing pre-programmed keys PF3 and PF5, respectively. At the end of a call, the agent need only depress pre-programmed key PF6 to disconnect the agent from the call to await a next call.

The agent terminal call handling voice/data interface card 30 requires terminal software that recognizes and parses the DCP S-channel message(s) containing call related information, e.g. ANI, DNIS and social security or account number. The extracted information is stored in a pre-defined location in a specific window, e.g. Phone window 53, which preferably is not associated with a host window. Once stored in the Phone window 53, the information can be processed and sent to any of the other windows attached to host-based applications using existing features of the agent terminal, such as a window-to-window copy command. The copy command together with the ability to record keystrokes into function keys (which can be saved on the MCC 17 floppy diskette, represents the beginnings of a programmable mechanism for adaptation to customer specific installations. Using this approach, an agent can modify, e.g., place quotes around ANI, and send call related information by executing any of the agent terminal function keys.

This approach enables the agent or system administrator to automate much of the interaction between the network and the telemarketing application. Play-back of function keys also enables agents to pace themselves and ensure that specific network information is aligned with the appropriate screen or window within the telemarketing application. For example, when host window 57 asks for the caller's social security number, a function key containing commands to copy the provided social security number from Phone window 53 to the telemarketing Host window 57, is played-back. The operation of the function key removes the need for the agent to ask for the caller'social security number, or any other call related information, and eliminates the possibility of keyboard entry errors. However, for other situations or applications, certain information received from network 11 should be processed and sent to the appropriate host application database computer system 18 or 19 as soon as the voice call is received by the agent terminal 14$_i$, without agent intervention. The need for immediate processing occurs, for example, in the handling of the unique called number (DNIS) for selecting the correct one of the many telemarketing campaigns or services assigned to each agent terminal. Information based on DNIS is used by the telemarketing application program to pull-up windows associated with a particular campaign or service to be provided.

The ability to automate the processing of call related information when it is sent to agent terminal $14_i$, can also be addressed using customer recorded keystrokes associated with programmable function keys. A special keystroke sequence, which can be stored for any function key, will be defined that points to another function key that contains commands, such as COPY, that are to be executed upon receipt of an incoming voice call. However, the function key containing the special keystroke sequence is never executed. Rather, it is used to initialize the agent terminal $14_i$ for automatic operation. For example, assume that function key PF8 contains the following keystroke: "%%PF9". The percent signs tells agent terminal $14_i$ that the content of specified function key PF9 should be executed whenever the agent terminal receives an incoming voice call. Under the above example, PF9 would contain the keystroke/commands necessary to copy the social security information from Phone window 53 to Host window 56 or 57 waiting for the selection of a particular service. Function key PF8, therefore, provides: (1) customer flexibility in the usage and assignment of PF keys for integrated voice/data operation of the agent terminal, (2) an automatic mechanism to disable the integrated voice/data operation by, for example, simply not recording a sequence beginning with "%%" in any PF key, and (3) simple administration of changes in the integrated voice/data operation by re-recording function key to point to another function key containing a new set of COPY commands.

Figure 6:
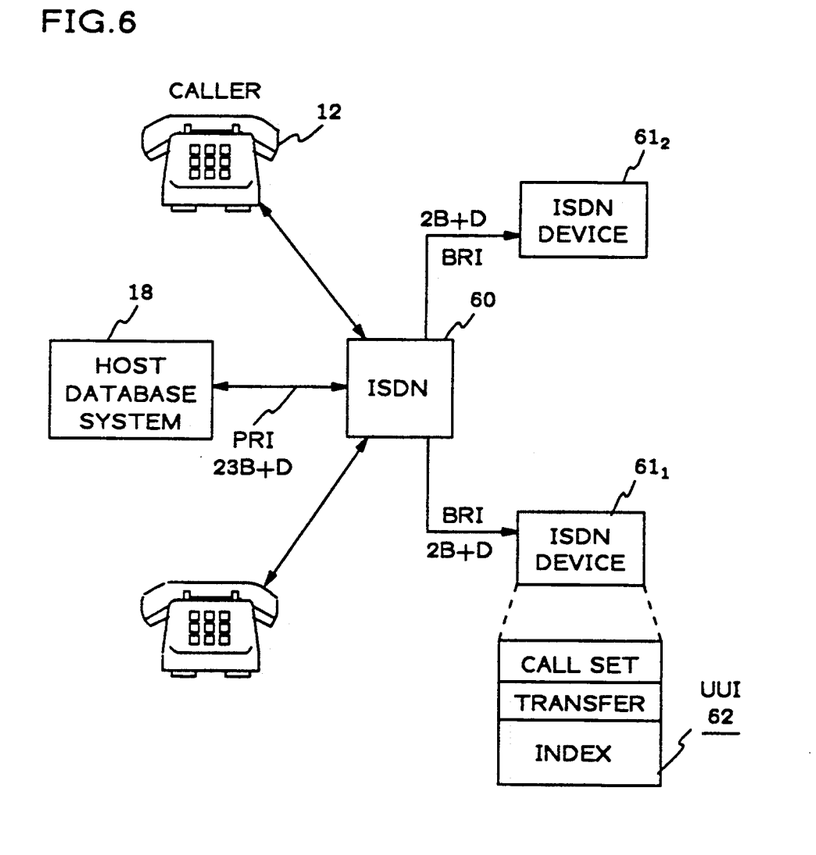
FIG. 6 is a block diagram of a generalized system in which the present call transfer invention can be used.

In the hereinbefore discussed system, the depression of the PF4 key provides a transfer of the current call to a pool of agent terminal(s) or supervisor terminal(s), from which one agent terminal, e.g. $14_2$ is selected. In accordance with the present invention, call transfer is effected in the following manner with reference to FIG. 4. In a preferred embodiment, when a call is initially provided to a first agent terminal, e.g., agent terminal $14_1$ in FIG. 4, the host application software at the associated host database system, e.g., host database system 18, assigns a unique index number to the call. Thereafter host database system 18 increments that index number for each automatic or manual request made by that agent terminal $14_1$ for additional data for windows 56 and 57, thereby keeping an indication of what is currently displayed at agent terminal $14_1$ for that call. The current index number is stored at the host and is also sent to agent terminal $14_1$ for storage with each new index value. Therefore, the current index number at host database system 18 and first agent terminal $14_1$ indicates the current state of the information sent to and displayed in windows 53, 56 and 57 at that first agent terminal handling the call. When a call must be transferred, the first agent at terminal $14_1$ depresses the transfer key (PF4), and a Call Transfer Executive (CTE) program at agent terminal $14_1$ initiates a transfer of the call to a group or pool of one or more preferred second agent or supervisor terminals that are associated with the service requested by caller 12. This call transfer procedure is performed in a preferred embodiment of the present invention by first agent terminal $14_1$ sending an indication to PBX 13 that the voice and data are to be transferred to a predetermined group of second agent terminals by the depression of the PF4 Transfer Key. The first agent terminal $14_1$ then sends a data User-To-User Information (UUI) 62 to PBX 13, as shown in FIG. 6, including (1) a first section comprising the "Call Set" information formed from the call related information found in the Phone Window 53, (2) a "Transfer" section directing the transfer to a group of pool of second agent or supervisor terminal(s) to which the call is to be transferred, (3) and a third and novel section including the current "index" number for that call. Comparatively speaking, the Index number is placed in an envelope and sent with the other UUI message information to PBX 13 for delivery to the chosen second preferred agent terminal to which the call is to be transferred.

Figure 4:
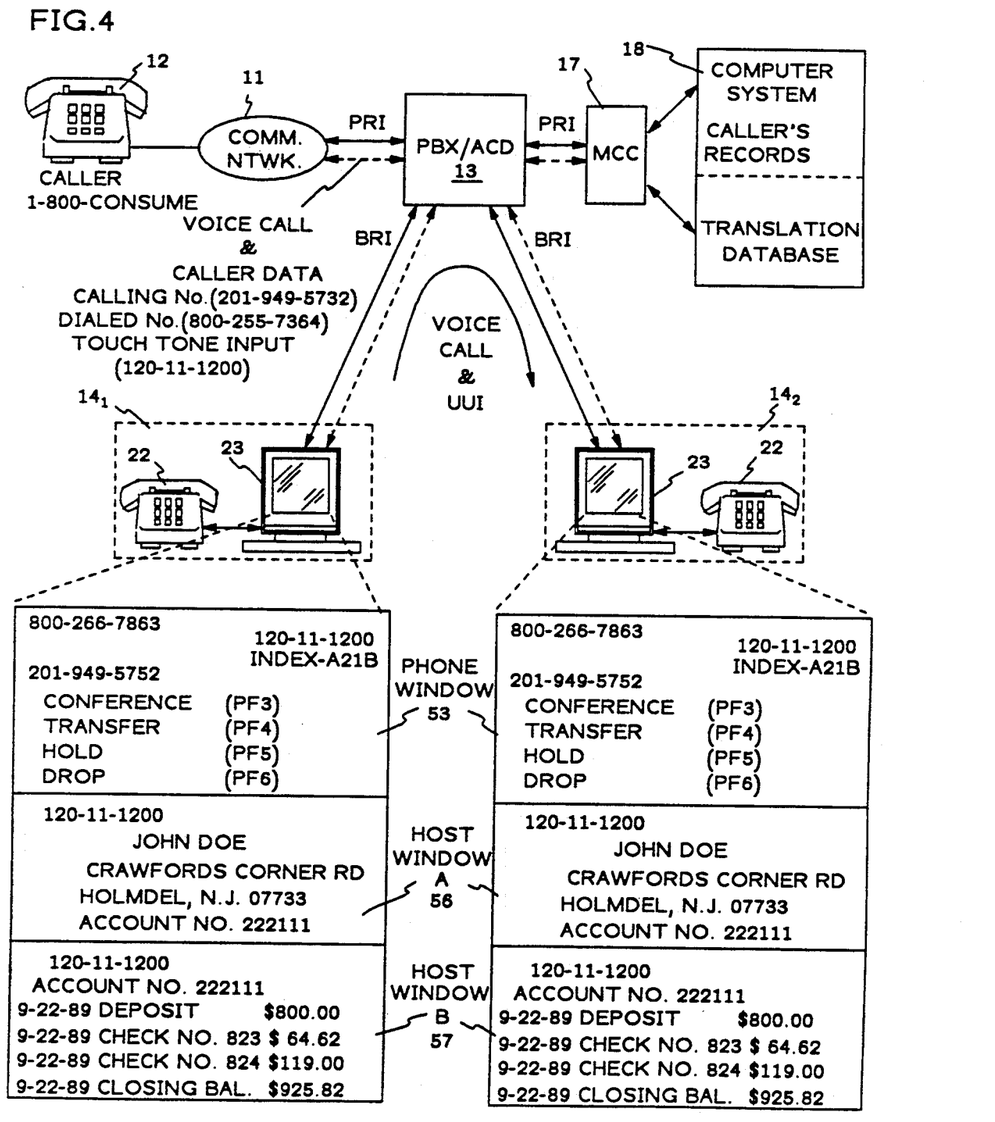
FIG. 4 is a block diagram of the call transfer process between agent terminals coupled to the same host database computer system in accordance with the preferred embodiment of the present invention.
Figure 5:
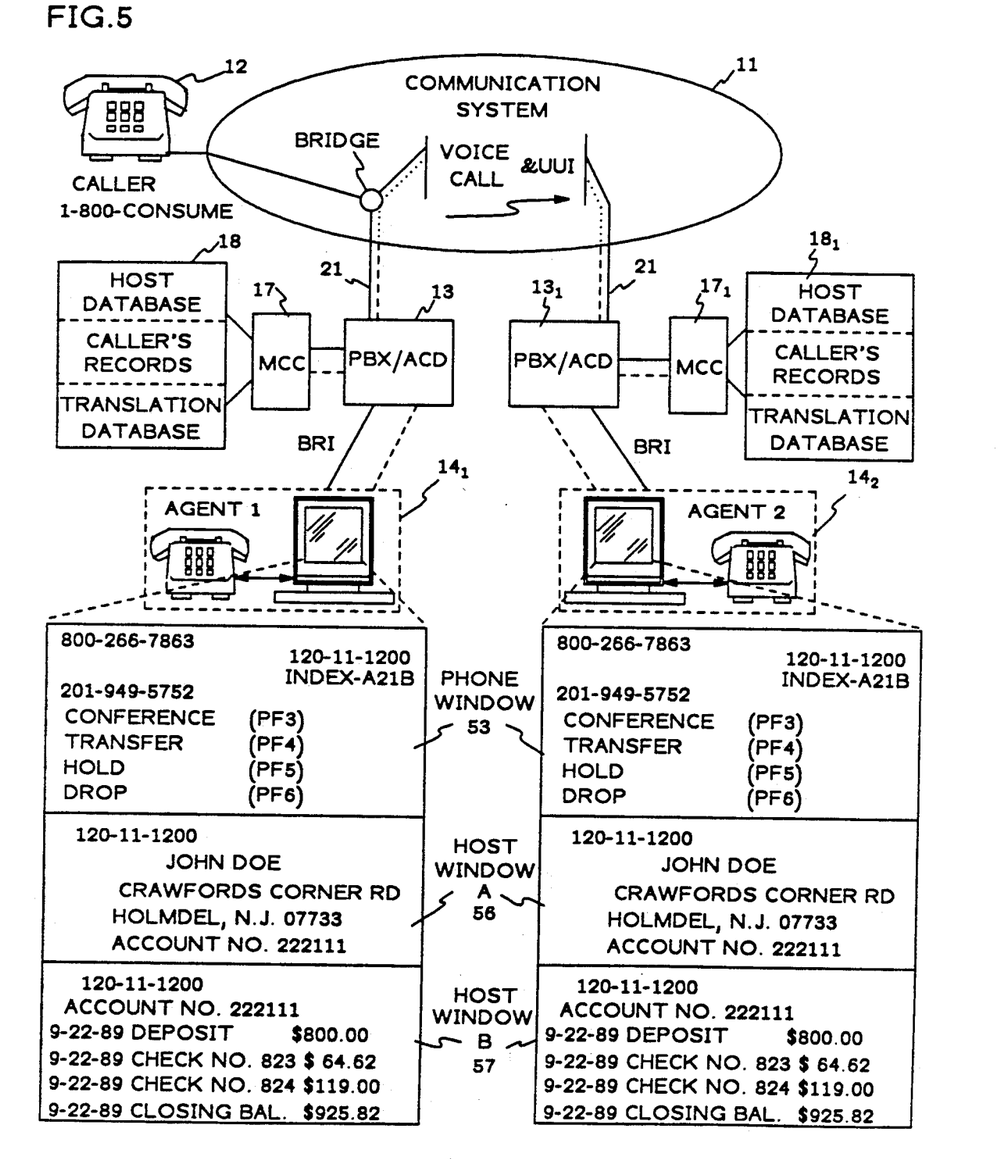
FIG. 5 is a block diagram of a call transfer process between remote agent terminals coupled to separate host database computer systems in accordance with the preferred embodiment of the present invention.

PBX 13 receives the UUI message and transfers the voice and UUI message information to an idle second agent terminal, e.g., agent terminal $14_2$ of the group or pool of second preferred agent or supervisor terminals destined for the call. The second preferred agent or supervisor terminal $14_2$ receiving the transferred call need only display the Call Set information in the "Phone" window and transmit the received Index number to the same host database system 18 using the same window-to-window copy function defined hereinbefore. Once host database system 18 receives the Index number, it transmits the appropriate window display information indicated by that index number to the second preferred agent terminal to duplicate what was displayed in the last set of windows 53, 56, and 57 of first agent terminal $14_1$, and initiates a "conversation" with second preferred agent or supervisor terminal $14_2$ at the same point of the conversation where the first agent is. Thereafter, the first agent can disassociate the first agent terminal 14 at any desired time. Therefore, the present invention permits calls to be transferred to a pool of agents or one specific agent without knowledge of the first agent, and PBX 13 need not know a specific agent to transfer the call to but may chose from a pool of agents. The information request still appears to the host database system 18 to be transmitted by the second agent terminal $14_2$. Where the preferred second agent, e.g., terminal $14_2$ to which the above-mentioned call has been transferred, has completed the prior voice call but is still completing the input of, for example, the order placed by that prior voice call, the present voice call and data will be transferred by PBX 13 to second preferred agent terminal $14_2$, but the host database system 18 may not be able to send data associated with the transferred call to preferred second agent terminal $14_2$ until the data session of the second agent terminal has been completed. Therefore, the second preferred agent $14_2$ would place the voice call on hold and store the UUI data, e.g., call set, and index, and release them to access host database system 18 upon completion of the prior call's data session, or conversation, to bring up the right screen display for the present call.

Where the preferred second agent $14_2$ is at a remote location, and is associated with both another PBX $13_1$ and host database system $18_1$, as shown in FIG. 5, then the following procedure could be followed. In this case, the first transferring agent terminal $14_1$ would still send the voice call and UUI data to PBX 13 for transfer via a bridge in the PBX 13, or communication system 11 to PBX $13_1$, and second preferred terminal $14_2$. Since second host database system $18_1$ would not recognize such index number, the call set related information sent from agent terminal $14_1$ and placed in Phone window 53 associated with second preferred agent terminal $14_2$ would be sent to second host database system $18_1$ to bring up the necessary information in windows 56 and 57 at the second preferred agent terminal screen as done with the originally received call. The second preferred agent would then continue the call and eventually conclude the call with the PF6 key or transfer the call to still another colocated or remote third agent or supervisor terminal with the PF4 key.

FIG. 6 illustrates the broadest aspects of the present invention for an Integrated Services Digital Network (ISDN) 60, which can equate to communications network 11 of FIG. 1, which is coupled to (a) telephones, e.g. 12, (b) an exemplary first and second ISDN device $61_1$ and $61_2$, respectively, using an exemplary 2B+D channel Basic Rate Interface (BRI) protocol, and (c) a host database system 18 using the exemplary 23B+D channel PRI protocol. For purposes of description, it will be assumed that a call from caller 12 exists at first ISDN device $61_1$, and pertinent call related and other data which is received from ISDN 60 and host database system 18 is displayed on a terminal display device of ISDN device $61_1$ relating to that call. As described before, the host database system 18 provides an index number indicative of the current data supplied to ISDN device $61_1$ which is stored both at host database system 18 and ISDN device $61_1$. When a call is transferred, the UUI 62 information is transferred with the voice call via ISDN 60 to a second ISDN device $61_2$, and second ISDN device uses the index number to access host database system 18 to bring up the same information that was displayed on ISDN device $61_1$ just prior to the transfer. Host database system 18 then continues the call with ISDN device $61_2$ by incrementing the index number for each new request made by ISDN device $61_2$ while providing the requested information. With such an arrangement, the ISDN could be communications system 11, as indicated above, or a PBX, switch, or other suitable device, and the ISDN devices $61_i$ can be any suitable voice and display devices that will work with ISDN 60 and host database system 18 and receive a voice and data call.

It is to be understood that the above-described embodiments are simply illustrative of the principles of the invention relative to a preferred embodiment. Various other modifications and changes may be made by those skilled in the art which will embody the principles of the invention and fall within the spirit and scope thereof. For example, call related information could be received by system 10, or by an agent terminal $14_i$, using any suitable technique, as, for example, in the header information of a packet of information for subsequent processing in the manner outlined hereinbefore. The present invention provides an agent terminal with the ability to read and display received call related information in a first telephony window while using programmable function key commands that are either software or key initiated to automatically obtain the desired campaign information from a host application database computer system for display at the agent terminal, and automatically transfer information between telephony and application windows. The user/system administrator is able to program the programmable function keys of the agent terminals for various steps of servicing a call for each particular service (campaign) being responded to, and such programming is preferably stored on a disk in MCC 17, or similar device, for downloading into an agent terminal in, for example, shared RAM 40 or other RAM when that agent terminal originally logs in for a session. It is to be understood that such programming for the function keys of an agent terminal could alternatively be inserted into a floppy disk drive at each agent terminal. Additionally, agent terminal 14 can also be used for placing outgoing calls to customers over communications network 11 by, inter alia, bringing up a customer's record in a host application window and, for example, automatically using a programmable key to dial the customer's telephone number, and performing operations similar to those described hereinbefore for other functions of such outgoing call.

What is claimed is:

1. A method of transferring an integrated voice/data call signal including call-related data received from a communications system between a first and a second agent terminal, where each agent terminal is associated with at least one host application database computer system for storing information associated with each service or campaign that the first and second agent terminals is to handle, the method comprising the steps of:
   (a) at the first agent terminal (i) directing the voice call from the communications system to an associated voice communication device, and (ii) displaying the call-related information received from the communications system in a first window of an associated multi-window visual display device, and (iii) accessing the at least one host application database computer system for retrieving and displaying predetermined host application database computer system information at the visual display device;
   (b) transferring the voice call and associated predetermined data from the first agent terminal to the second agent terminal by transferring (1) the voice portion of the call to a voice communication device of the second agent terminal, and transmitting (2) predetermined data relating to a portion of the data currently displayed at the first agent terminal directly to the second agent terminal: and
   (c) at the second agent terminal, (1) receiving the voice call and predetermined data from the first agent terminal, and transmitting a certain portion of the received predetermined data to the associated at least one host application database computer system for retrieving and displaying the data associated with the call at a visual display device of the second agent terminal.

2. The method according to claim 1 wherein the first and second agent terminals can access the same at least one host application database computer system, and comprise the further steps of:
   (d) in performing step (a)(ii), maintaining an indication of the current status of information displayed in the first and second windows at the first agent terminal during the progress of a call;
   (e) in performing step (b), transmitting the call-related information received from the communications system along with the status indication from step (d) to the second agent terminal; and
   (f) in performing step (c), the second agent terminal transmitting the received display status indication to the at least one host application database computer system for retrieving and displaying the data displayed at the transferring first agent terminal.

3. The method according to claim 2 wherein in performing step (d)
   (d1) maintaining an index at the first agent terminal and at the at least one host application database computer system and incrementing the index for each step in retrieving and displaying data in the first and second windows of the first agent terminal.

4. The method according to claim 1 wherein the first and second agent terminals are associated with the same or a different at least one host application database computer system, and the method comprising the further steps of:
   (d) in performing step (b), transmitting a predetermined portion of the call-related data received from the communications system to the second agent terminal; and
   (e) in performing step (c), the second agent terminal transmitting a predetermined pertinent portion of the received call-related information to the at least one host application database computer system for retrieving and displaying the data originally displayed in the first and second windows at the first agent terminal.

5. The method according to claim 1, 2, 3, or 4 wherein the call-related data comprise any combination of a calling number, a called number, and data associated with the caller and/or call.

6. A customer programmable integrated voice and data call-handling system for handling calls for at least one campaign or service comprising:
   at least one host application database computer system for storing database information relating to each campaign or service the call handling system is to handle;
   a first agent terminal comprising
   (i) a visual display device,
   (ii) a voice communication device,
   (iii) means for receiving voice calls from a remote communication system and (a) directing the voice call to the voice communication device, and (b) accessing the at least one host application database computer system for retrieving and displaying predetermined host application database information in the visual display device; and
   (iv) means for transferring a call to a second agent terminal by (a) transferring the voice portion of the call, and (b) transmitting predetermined data relating to a portion of the data currently displayed at the first agent terminal directly to the second agent terminal.

7. The customer programmable integrated voice and data call-handling system according to claim 6 wherein the second agent terminal includes means for using the transmitted predetermined data for accessing the at least one host application database computer system to retrieve and display the data in a visual display device of the second agent terminal.

8. The customer programmable integrated voice and data call-handling system according to claim 6 or 7 wherein
   the at least one host application database computer system and the receiving means of the first agent terminal on a call comprise means for maintaining an indication of the current status of information displayed during the progress of a call; and
   the transferring means of the first agent terminal transmits the voice call received from the communications system along with the status indication to a second agent terminal in transferring a call.

9. The customer programmable integrated voice and data call-handling system of claim 8 wherein the status indication is an index which is incremented for each portion of the data at the visual display device of an agent terminal.

10. The customer programmable integrated voice and data call-handling system of claim 7 wherein the first and second agent terminals are not coupled for accessing the same host application database computer system, and
   the transferring means sends the call-related information signals received from the communications system to the second agent terminal for use by the second agent terminal to access the associated host application computer system to retrieve and display pertinent data at the second agent terminal.

11. The customer programmable integrated voice and data call-handling system according to claim 6 or 7 wherein the call-related information signals comprise any combination of a calling number, a called number, and data associated with the caller and/or call.

* * * * *